(No Model.)
H. W. HUEFFELMANN.
MEAT CUTTER.
No. 451,273. Patented Apr. 28, 1891.
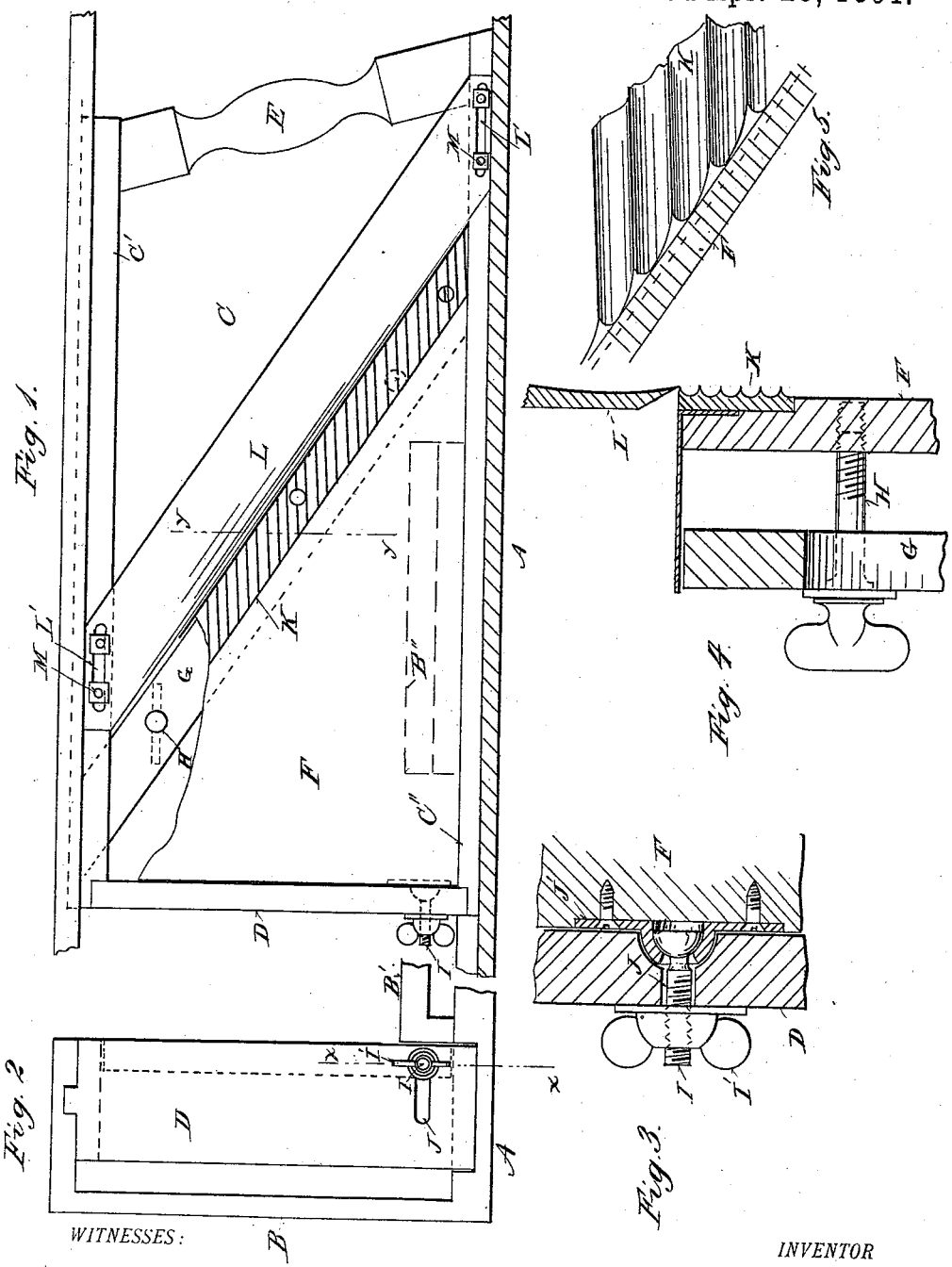
WITNESSES:
H M Plaisted
Warren Hull
INVENTOR
H. W. Hueffelmann
BY
H. A. Toulmin
HIS ATTORNEY.

UNITED STATES PATENT OFFICE.

HENRY W. HUEFFELMANN, OF DAYTON, OHIO.

MEAT-CUTTER.

SPECIFICATION forming part of Letters Patent No. 451,273, dated April 28, 1891.

Application filed September 22, 1890. Serial No. 365,789. (No model.)

*To all whom it may concern:*

Be it known that I, HENRY W. HUEFFELMANN, a citizen of the United States, residing at Dayton, in the county of Montgomery and State of Ohio, have invented certain new and useful Improvements in Meat-Cutters, of which the following is a specification, reference being had therein to the accompanying drawings.

My invention relates to new and useful improvements in meat-cutters, the peculiarities of which will be hereinafter more fully described, and set forth in the claims.

In the accompanying drawings, forming a part of this specification, and on which like reference-letters indicate corresponding parts, Figure 1 represents a front elevation of the cutter and its supporting-guides, the platform for the meat being indicated in broken lines; Fig. 2, an end view of the same; Fig. 3, a section of the pivotal connection and adjacent parts on the line $x\ x$ of Fig. 2; Fig. 4, a sectional view on the line $y\ y$ of Fig. 1; and Fig. 5, a view of a portion of the corrugated strip, showing the sharp entering ends of the same.

A designates a supporting-base of any suitable construction adapted to receive a meat-cutter, and having a vertical portion B, with a lateral extension at the top, in which is a groove that serves as a top guide for the cutter-frame C, in which is a knife-blade. A platform B' (indicated in Fig. 1 by the broken lines) conveniently supports the meat as it is fed to the knife, as will presently be described. The knife-frame C preferably consists of two strips, the upper of which C' is tongued or otherwise adapted to move in a groove of the upper guide and the lower one C'' to slide within the lower guide in said base A. These strips are preferably joined by a cross-piece D at their front ends and by a suitably-formed handle E at the rear end. Within the knife-frame is supported the adjustable board F, adjacent to a bar G, diagonally fastened as a brace or otherwise within said knife-frame and carrying adjusting-screws H, adapted to engage with said adjustable board, as shown in Fig. 4. The front end of this board is pivotally fastened to the said knife-frame, preferably by means of a knuckle-joint consisting of a bolt I, provided with a semi-spherical head, the shank of which extends through a transverse slot J in the knife-frame, as seen in Fig. 2, and is clamped by a winged nut I', the head being mounted in a spherical socket J', secured to said adjustable board, and thus forming a pivotal connection, whereby the opposite end of said board can be moved in and out and adjusted in any direction with respect to the knife-blade by means of screws H about this end as a pivot without loosening the said spherical-headed bolt. Any slight adjustment to vary the thickness of the slice cut may thus be easily made without altering the position of the pivoted end of the board, which acts as the center of adjustment, and without springing the said board out of its true shape, and thus causing uneven thickness of each slice, and thereby destroying its vital principle as a beef-cutter.

As the adjustment is often made to cut to the thickness of a sheet of paper, it is important that the adjustable board should preserve its correct and true alignment with regard to the knife-blade, and this is effected, preferably, by the universal pivotal connection, as above described.

When it is desired to cut slices of considerable thickness, in which case the adjustable board might be inconveniently slanted, the knuckle-bolt may be loosened and set over to the desired distance in the transverse slot J in the front end D of the knife-frame. Any other means for pivoting said adjustable board at one end, while allowing the other end to be adjusted in and out without binding, springing, twisting, or straining the board, as accomplished by my device, may be employed.

A corrugated metallic plate or strip K is attached to the upper edge of the adjustable board opposite its pivotal connection, and in close proximity and parallel to the cutting-edge of the knife L, which is diagonally mounted on said knife-frame, and conveniently adjusted by the bolts M and slots L'. When in position, the crests of these corrugations preferably run nearly parallel to the direction that the knife moves, but with a slight rise upward and outward toward the knife-edge in either direction, and extend slightly beyond the surface of the adjustable board F. The entering end of each corrugation being lower than the other or rear end of the same, the rear end of each corrugation will therefore leave the meat at a higher point than the entering end engages with it, thus acting to stretch it at the freshly-cut surface, preparatory to the cutting action of the knife thereon. The entering edge of the plate is oblique to the direction of the corrugations, and sharp chisel-edges or entering ends are thus formed on the corrugations, as shown in Fig. 5, which act like a plow to cut or shear a path for each corrugation, which is thus kept in intimate contact with the meat in order to support the same under the cutting action of the knife. The upward slant of the corrugations stretch the meat immediately before slicing, and the lifting tendency working against the downward pressure of the knife-edge on the meat promotes the slicing action. Any convenient form of corrugation may be used as long as the entering ends thereof are sharpened and act as above described. The corrugated strip need be of but slight width, because the sharpened entering ends of the corrugations act immediately to secure intimate engagement with the meat.

The slotted knife-blade L, attached to said knife-frame C, has a draw-cutting or other action, and its cutting-edge is turned outward slightly, as shown in Fig. 4, so that its face next to the meat operated upon is slightly concaved, whereby the meat is drawn into closer contact with the knife during the cutting operation, instead of being forced away from the same by the pressure of the knife thereon. This action of the blade, together with the close primary contact of the supporting corrugations, due to their sharpened entering ends, and also their tendency to raise the meat toward the knife acting thereon, also promotes the slicing action and gives any desired degree of thinness, as well as uniformity, to the slices cut. In operation the meat or other substance is laid on the platform B' and pressed against the adjustable board, and a forward thrust of the knife-frame shears off a slice by the knife-blade, preferably of the above-described construction, mounted thereon.

Having thus fully described my invention, what I claim as new, and desire to secure by Letters Patent, is—

1. In a meat-cutter, the combination, with a knife and a knife-frame, of an adjustable board universally pivoted to said frame at a single point opposite the knife-edge and adjustable at the edge next to the knife, means to pivot it, and means to adjust it, whereby one edge may be adjusted about the fastening-point as a central universal pivot.

2. In a meat-cutter, the combination, with a knife and a knife-frame having a transverse slot, of an adjustable board pivoted at one end to said frame, a knuckle-joint forming said pivotal connection, consisting of a socket carried by said board, and a spherical-headed bolt mounted therein extending through the slot in the said frame, and means to fasten said board in its adjusted position, and means to adjust the opposite edge parallel to the knife-edge, all substantially as shown and described.

3. In a meat-cutter, the combination, with a movable frame, a knife, and an adjustable board, both carried by said frame, of a series of corrugations on the adjustable board immediately in front of the knife-edge, the direction of the crests of the said corrugations being inclined to the direction of movement of said frame, whereby the rear end of each corrugation will leave the meat at a higher point than the entering end engages with it to stretch it at the freshly-cut surface, and the knife will act on said meat while in its stretched condition.

4. In a meat-cutter, the combination, with guides and a movable knife, of a series of corrugations moving with said knife and immediately in front thereof, the line of direction of the crests of said corrugations being oblique to the direction of the movement of the knife in said guides, whereby the surface of the meat acted on is stretched by the passage of said corrugations through the same preparatory to the cutting action of the knife thereon.

In testimony whereof I affix my signature in presence of two witnesses.

HENRY W. HUEFFELMANN.

Witnesses:
CHRIST LUCHES,
JACOB STEPHANS.